(12) United States Patent
Davis

(10) Patent No.: US 10,110,994 B1
(45) Date of Patent: Oct. 23, 2018

(54) METHOD AND APPARATUS FOR PROVIDING VOICE COMMUNICATION WITH SPATIAL AUDIO

(71) Applicant: NOKIA TECHNOLOGIES OY, Espoo (FI)

(72) Inventor: Ian Davis, Delgany (IE)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 15/819,889

(22) Filed: Nov. 21, 2017

(51) Int. Cl.
| | |
|---|---|
| *H04R 1/40* | (2006.01) |
| *G10L 21/0232* | (2013.01) |
| *H04R 3/04* | (2006.01) |
| *H04R 3/00* | (2006.01) |
| *G10L 21/0208* | (2013.01) |

(52) U.S. Cl.
CPC .......... *H04R 1/406* (2013.01); *G10L 21/0232* (2013.01); *H04R 3/005* (2013.01); *H04R 3/04* (2013.01); *G10L 2021/02082* (2013.01)

(58) Field of Classification Search
CPC .......... H04R 1/406; H04R 3/005; H04R 3/04; G10L 21/0232; G10L 2021/02082
See application file for complete search history.

(56) References Cited

U.S. PATENT DOCUMENTS

| | | | |
|---|---|---|---|
| 6,931,123 B1 | 8/2005 | Hughes | |
| 7,012,630 B2 | 3/2006 | Curry et al. | |
| 7,421,113 B2 | 9/2008 | Taylor | |
| 7,667,728 B2 | 2/2010 | Kenoyer et al. | |
| 8,391,472 B2 | 3/2013 | Ghani et al. | |
| 8,508,576 B2 | 8/2013 | Liu et al. | |
| 8,666,047 B2 | 3/2014 | Rambo | |
| 8,693,713 B2 | 4/2014 | Chen et al. | |
| 9,449,233 B2 | 9/2016 | Taylor | |
| 9,584,758 B1 | 2/2017 | Chen et al. | |
| 9,654,868 B2 | 5/2017 | Benattar | |
| 9,659,555 B1 | 5/2017 | Hilmes et al. | |
| 9,659,576 B1 | 5/2017 | Kotvis et al. | |
| 9,866,952 B2 * | 1/2018 | Pandey | H04R 1/406 |
| 9,928,847 B1 * | 3/2018 | Cleve | G10L 21/0232 |

(Continued)

OTHER PUBLICATIONS

Brena, R. et al., *Evolution of Indoor Positioning Technologies: A Survey*, Journal of Sensors (Mar. 2017) 22 pages.
Herbert, S. et al., *Ultrasonic Indoor positioning for umpteen static and mobile devices*, SENSOR + TEST Conferences 2011—SENSOR Proceedings, 859-864.

(Continued)

*Primary Examiner* — Mohammad Islam
(74) *Attorney, Agent, or Firm* — Alston & Bird LLP

(57) ABSTRACT

A method, apparatus and computer program product enhance audio quality during a voice communication session, such as by enhancing audio quality for a remote participant in a meeting. In a method and for each of two or more microphones of a first device at a first location, a target audio signal is generated that has been steered in a direction of a target audio source in order to provide at least partial isolation from a second audio source in the same environment. The method also produces a filtered audio signal based on the target audio source at least from a respective one of the two or more microphones. The method also includes mixing the filtered audio signal from at least the first device to create an audio output signal associated with an audio playback format and causing the audio output signal to be output by a second device.

20 Claims, 9 Drawing Sheets

(56) References Cited

U.S. PATENT DOCUMENTS

| | | | | |
|---|---|---|---|---|
| 9,966,059 | B1* | 5/2018 | Ayrapetian | G10K 11/178 |
| 2014/0049596 | A1 | 2/2014 | El-Solh et al. | |
| 2014/0056435 | A1* | 2/2014 | Kjems | G10L 15/20 |
| | | | | 381/66 |
| 2014/0278383 | A1* | 9/2014 | Fan | G10L 25/84 |
| | | | | 704/224 |
| 2015/0063580 | A1* | 3/2015 | Huang | G10L 21/0208 |
| | | | | 381/66 |
| 2015/0078581 | A1 | 3/2015 | Etter et al. | |
| 2015/0371658 | A1* | 12/2015 | Gao | G10L 21/0208 |
| | | | | 381/66 |
| 2017/0178662 | A1* | 6/2017 | Ayrapetian | G10L 21/0216 |
| 2017/0358294 | A1* | 12/2017 | Hatfield | G10L 25/84 |

OTHER PUBLICATIONS

Maganti, Hari, *Speech Enhancement and Recognition in Meetings With an Audio-Visual Sensor Array*, IEEE Transactions on Audio, Speech, and Language Processing, vol. 15, No. 8 (Nov. 2007) 2257-2269.

Naqvi, S. et al., *Multimodal (audio-visual) source separation exploiting multi-speaker tracking, robust beamforming and time-frequency masking*, IET Signal Processing, vol. 6, Iss. 5 (Apr. 2011) 466-477.

Priyantha, N.B. et al. *The Cricket Location-Support System*, 6th ACM International Conference on Mobile Computing and Networking (ACM MOBICOM), (Aug. 2000) 12 pages.

Ward A. et al., *A New Location Technique for the Active Office*, (1999) [retrieved Dec. 19, 2017]. Retrieved from the Internet: <URL: http://citeseerx.ist.psu.edu/viewdoc/download?doi=10.1.1.49.1301&rep=rep1&type=pdf>. 11 pages.

* cited by examiner

METHOD AND APPARATUS FOR PROVIDING VOICE COMMUNICATION WITH SPATIAL AUDIO

TECHNICAL FIELD

An example embodiment relates generally to a method, apparatus and computer program product for providing voice communication and, more particularly, to a method, apparatus and computer program product for providing voice communication with spatial audio.

BACKGROUND

Point-to-point communication. e.g., voice communication, is widely used for a variety of applications. For example, the ubiquity of internet-based communication platforms, such as Webex, Google Hangouts and Skype, has enabled remote users to join meetings from any global location. However, remote users still suffer from a loss of immersion in comparison to the experience of attending a meeting in person. Typically, the remote user joins the meeting using a speakerphone and/or a laptop computer, and their voice is relayed into the meeting room using a single speaker. If two-way video communication is enabled, only a single viewpoint is generally available for the remote user from a single fixed camera, and the audio is not spatially linked to this visual viewpoint. This configuration results in a sub-optimal experience in which the remote user has a detached presence, and the illusion that they are "in the room" is rarely maintained.

Audio quality is of import in relation to the user experience in conjunction with voice communication. Poor quality audio undermines any attempts at effective communication. Furthermore, full immersion by the remote user can only be attained if the audio viewpoint matches the video.

Traditional methods of obtaining audio from a single location within a meeting room, which is then sent to the remote user(s), employ a single microphone (monaural) or two-microphone (stereo) mix from microphones onboard a single device. However, the efficacy of this approach is limited. If the audio source is nearer/farther from the active microphone(s), the sound levels will change and the audio source could be too loud or too quiet. While this change in sound levels could be overcome with auto-gain levelling schemes, the presence of other interfering audio or noise sources will cause these schemes to fail. Thus, the audio quality of many voice communication sessions, such as the audio quality provided to remote participant in a meeting, is less than desired which, in turn, diminishes the overall user experience.

BRIEF SUMMARY

A method, apparatus and computer program product are provided in accordance with an example embodiment in order to enhance the audio quality during a point-to-point communication session, e.g., a voice communication session, such as by enhancing the audio quality for a remote participant in a meeting. In order to enhance the audio quality, the method, apparatus and computer program product of an example embodiment provide spatial localization in order to enhance the relative strength of an audio source at a target location, such as a particular participant in the meeting who is speaking, while reducing the relative strength of other audio sources in the environment. The method, apparatus and computer program product of an example embodiment also provide a multi-channel audio output signals from audio signals captured by multiple microphones in order to provide a more fully immersive experience for the remote participant.

In an example embodiment, a method is provided for providing voice communication between at least a first device at a first location and at least a second device at a second location. At least the second device is remote from the first location. The method includes, for each of two or more microphones of at least the first device configured to capture a target audio source associated with the first location, generating a target audio signal and producing a filtered audio signal. The first device is one of a plurality of devices that are located in the same environment as the target audio source. The target audio signal is generated at least from audio signals captured by the two or more microphones that have been steered in a direction of the target audio source in order to provide at least partial isolation from a second audio source in the same environment as the target audio source. The filtered audio signal is produced based on the target audio source at least from a respective one of the two or more microphones. The filtered audio signal is produced so as to be based on the target audio signal that is steered in the direction of the target audio source, to deemphasize the second audio source and to reduce a contribution from audio signals output by a speaker located in the same environment as the target audio source. The method also includes mixing the filtered audio signal from at least the first device to create an audio output signal associated with an audio playback format and causing the audio output signal to be output by the second device in accordance with the audio playback format.

The method of an example embodiment produces the filtered audio signal by filtering an audio signal received from the respective microphone based upon the target audio signal, such as by utilizing an adaptive cancellation algorithm in order to separate a contribution of the target audio source from the second audio source. The method of another example embodiment produces the filtered audio signal by filtering the target audio signal based upon expected transmission characteristics of audio signals from the target audio source to the respective microphone. The method of an example embodiment generates the target audio signal by applying beamforming to audio signals received by a plurality of microphones in the same environment as the target audio source including the two or more microphones of the second device in order to steer the target audio signal in the direction of the target audio source. The method of another example embodiment generates the target audio signal by receiving the target audio signal from an ambisonic microphone in the same environment as the target audio source that has been steered in the direction of the target audio source.

In an embodiment in which audio signals, such as from a remote participant, are output from the speaker located in the same environment as the target audio source, the method may also include applying echo cancellation to the target audio signal prior to producing the filtered audio signal in order to reduce a contribution from the audio signals output by the speaker to the filtered audio signal. The method of an example embodiment also includes estimating a location of each of a plurality of microphones located in the same environment as the target audio source including the two or more microphones of the first device by analyzing a time-of-arrival of a mechanical pressure wave captured by each of the plurality of microphones in response to a mechanical pressure wave output by a source. The method of another example embodiment also includes estimating a location of each of a plurality of microphones located in the same environment as the target audio source including the two or more microphones of the first device by analyzing an image of the plurality of microphones.

In another embodiment, an apparatus is provided for providing voice communication between at least a first device at a first location and at least a second device at a second location. At least the second device is remote from the first location. The apparatus includes at least one processor and at least one memory including computer program code that are configured to, with the processor, cause the apparatus, for each of two or more microphones of at least the first device configured to capture a target audio source associated with the first location, generate a target audio signal and produce a filtered audio signal. The first device is one of a plurality of devices that are located in the same environment as the target audio source. The target audio signal is generated at least from audio signals captured by the two or more microphones that have been steered in a direction of the target audio source in order to provide at least partial isolation from a second audio source in the same environment as the target audio source. The filtered audio signal is produced based on the target audio source at least from a respective one of the two or more microphones. The filtered audio signal is produced so as to be based on the target audio signal that is steered in the direction of the target audio source, to deemphasize the second audio source and to reduce a contribution from audio signals output by a speaker located in the same environment as the target audio source. The at least one memory and the computer program code are also configured to, with the processor, cause the apparatus to mix the filtered audio signal from at least the first device to create an audio output signal associated with an audio playback format and cause the audio output signal to be output by the second device in accordance with the audio playback format.

The at least one memory and the computer program code are configured to, with the processor, cause the apparatus of an example embodiment to produce the filtered audio signal by filtering an audio signal received from the respective microphone based upon the target audio signal, such as by utilizing an adaptive cancellation algorithm in order to separate a contribution of the target audio source from the second audio source. The at least one memory and the computer program code are configured to, with the processor, cause the apparatus of another example embodiment to produce the filtered audio signal by filtering the target audio signal based upon expected transmission characteristics of audio signals from the target audio source to the respective microphone. The at least one memory and the computer program code are configured to, with the processor, cause the apparatus of an example embodiment to generate the target audio signal by applying beamforming to audio signals received by a plurality of microphones in the same environment as the target audio source including the two or more microphones of the first device in order to steer the target audio signal in the direction of the target audio source. The at least one memory and the computer program code are configured to, with the processor, cause the apparatus of another example embodiment to generate the reference audio signal by receiving the target audio signal from an ambisonic microphone in the same environment as the target audio source that has been steered in the direction of the target audio source. In an embodiment in which audio signals, such as from a remote participant, are output from the speaker located in the same environment as the target audio source, the at least one memory and the computer program code may be further configured to, with the processor, cause the apparatus to apply echo cancellation to the target audio signal prior to producing the filtered audio signal in order to reduce the contribution from the audio signals output by the speaker to the filtered audio signal.

In a further example embodiment, a computer program product is provided for providing voice communication between at least a first device at a first location and at least a second device at a second location. At least the second device is remote from the first location. The computer program product includes at least one non-transitory computer-readable storage medium having computer-readable program code portions stored therein with the computer-readable program code portions configured, upon execution and for each of two or more microphones of at least the first device configured to capture a target audio source associated with the first location, to generate a target audio signal and to produce a filtered audio signal. The first device is one of a plurality of devices that are located in the same environment as the target audio source. The target audio signal is generated at least from audio signals captured by the two or more microphones that have been steered in a direction of the target audio source in order to provide at least partial isolation from a second audio source in the same environment as the target audio source. The filtered audio signal is produced based on the target audio source at least from a respective one of the two or more microphones. The filtered audio signal is produced so as to be based on the target audio signal that is steered in the direction of the target audio source, to deemphasize the second audio source and to reduce a contribution from audio signals output by a speaker located in the same environment as the target audio source. The computer-readable program code portions are also configured to, with the processor, cause the apparatus to mix the filtered audio signal from at least the first device to create an audio output signal associated with an audio playback format and cause the audio output signal to be output by the second device in accordance with the audio playback format.

In an example embodiment, the program code portions configured to produce the filtered audio signal include program code portions configured to filter an audio signal received from the respective microphone based upon the target audio signal by utilizing an adaptive cancellation algorithm in order to separate a contribution of the target audio source from the second audio source. In another example embodiment, the program code portions configured to produce the filtered audio signal include program code portions configured to filter the target audio signal based upon expected transmission characteristics of audio signals from the target audio source to the respective microphone. In an example embodiment, the program code portions configured to generate the target audio signal include program code portions configured to apply beamforming to audio signals received by a plurality of microphones in the same environment as the target audio source including the two or more microphones of the first device in order to steer the target audio signal in the direction of the target audio source.

In yet another example embodiment, an apparatus is provided for providing voice communication between at least a first device at a first location and at least a second device at a second location. At least the second device is remote from the first location. The apparatus includes, for each of two or more microphones of at least the first device configured to capture a target audio source associated with the first location, means for generating a target audio signal and means for producing a filtered audio signal. The first device is one of a plurality of devices that are located in the same environment as the target audio source. The target audio signal is generated at least from audio signals captured by the two or more microphones that have been steered in a direction of the target audio source in order to provide at least partial isolation from a second audio source in the same environment as the target audio source. The filtered audio signal is produced based on the target audio source at least from a respective one of the two or more microphones. The filtered audio signal is produced so as to be based on the target audio signal that is steered in the direction of the target audio source, to deemphasize the second audio source and to reduce a contribution from audio signals output by a speaker located in the same environment as the target audio source. The apparatus also includes means for mixing the filtered audio signal from at least the first device to create an audio output signal associated with an audio playback format and means for causing the audio output signal to be output by the second device in accordance with the audio playback format.

BRIEF DESCRIPTION OF THE DRAWINGS

Figure 1:
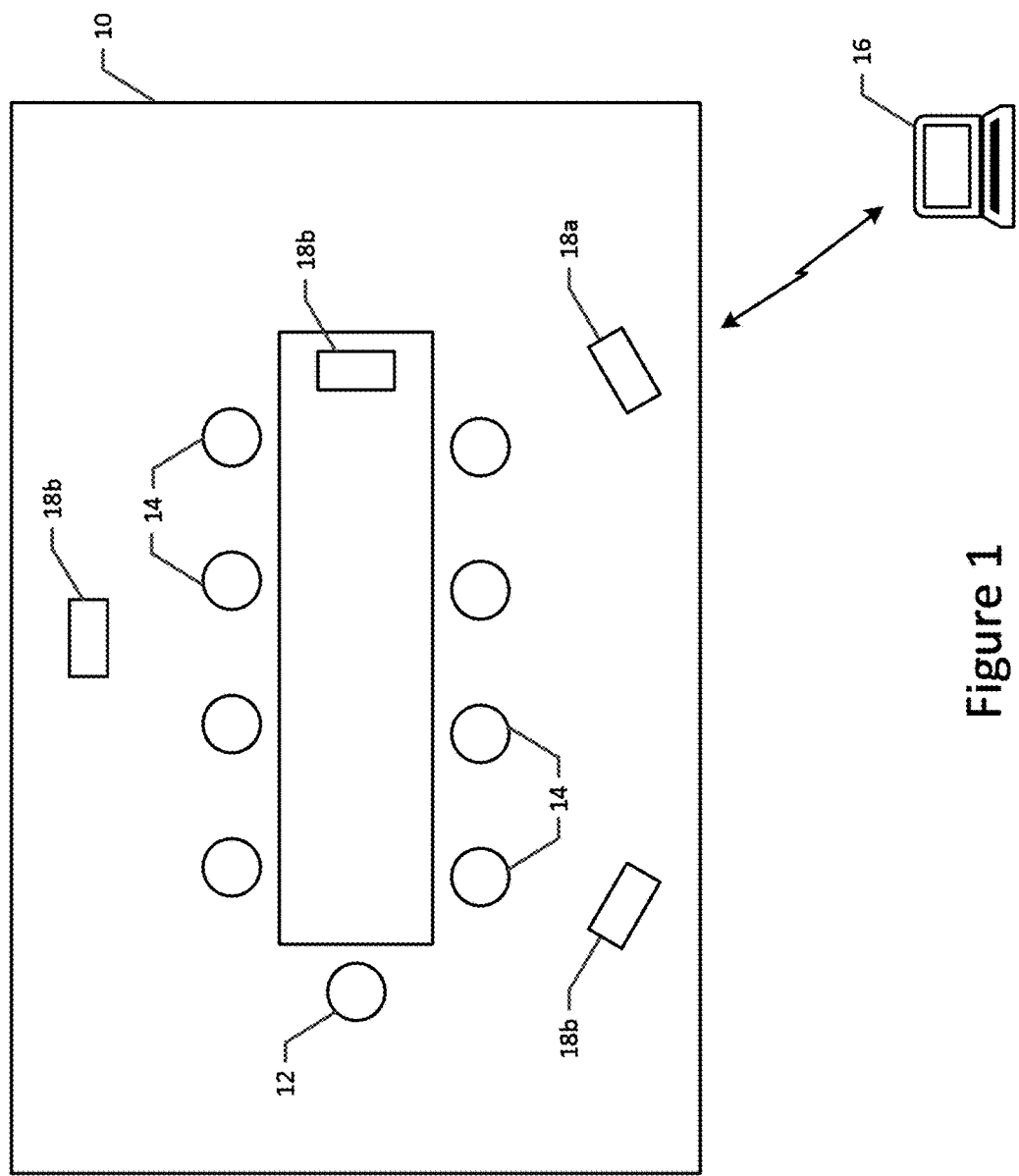
Figure 2:
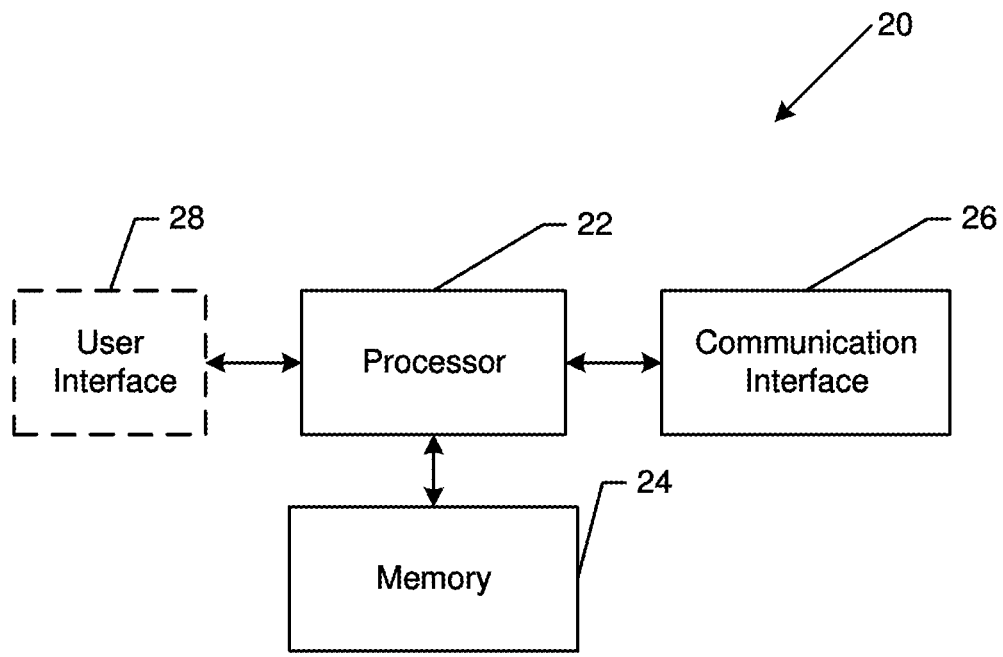
Figure 3:
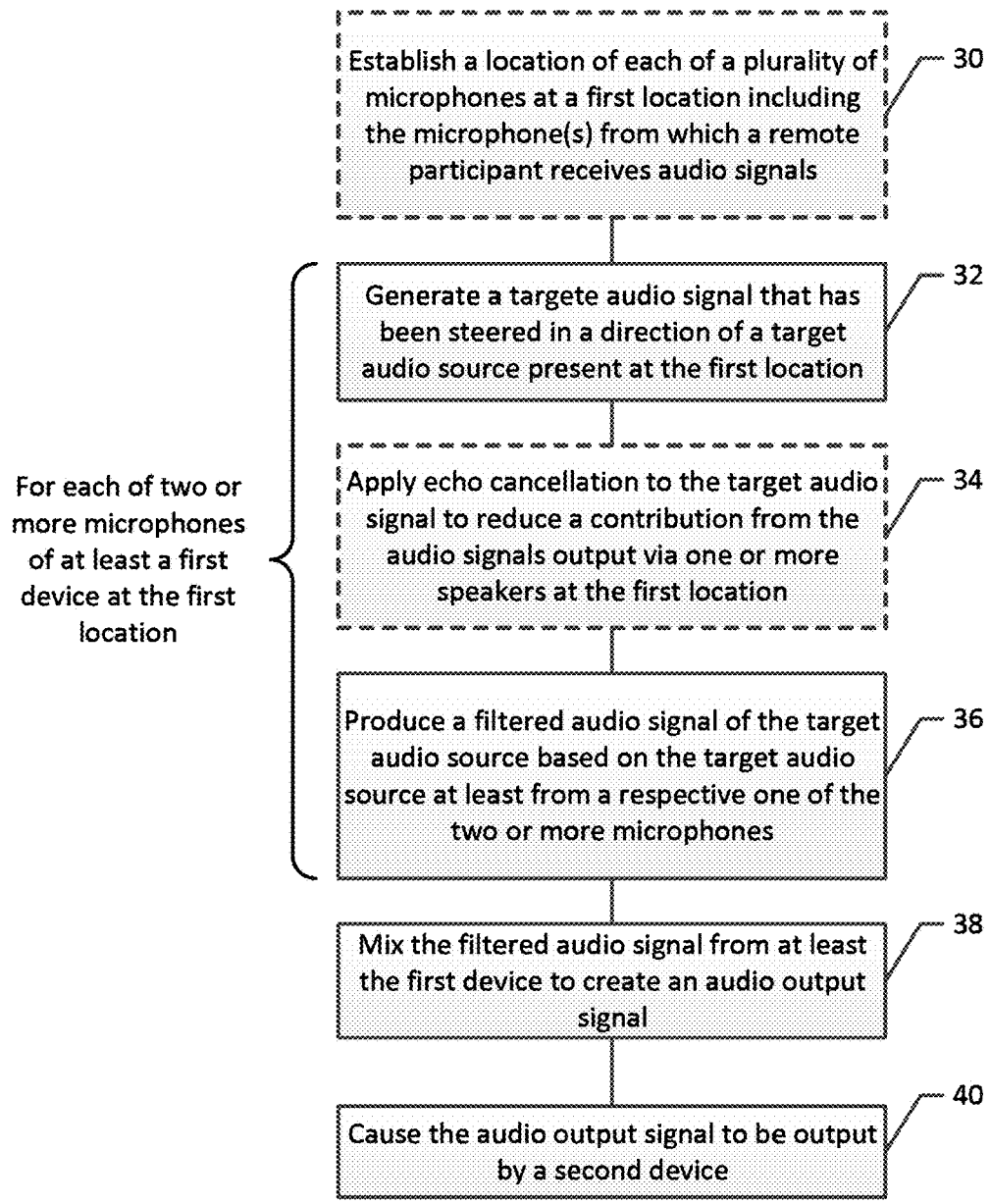
Figure 4:
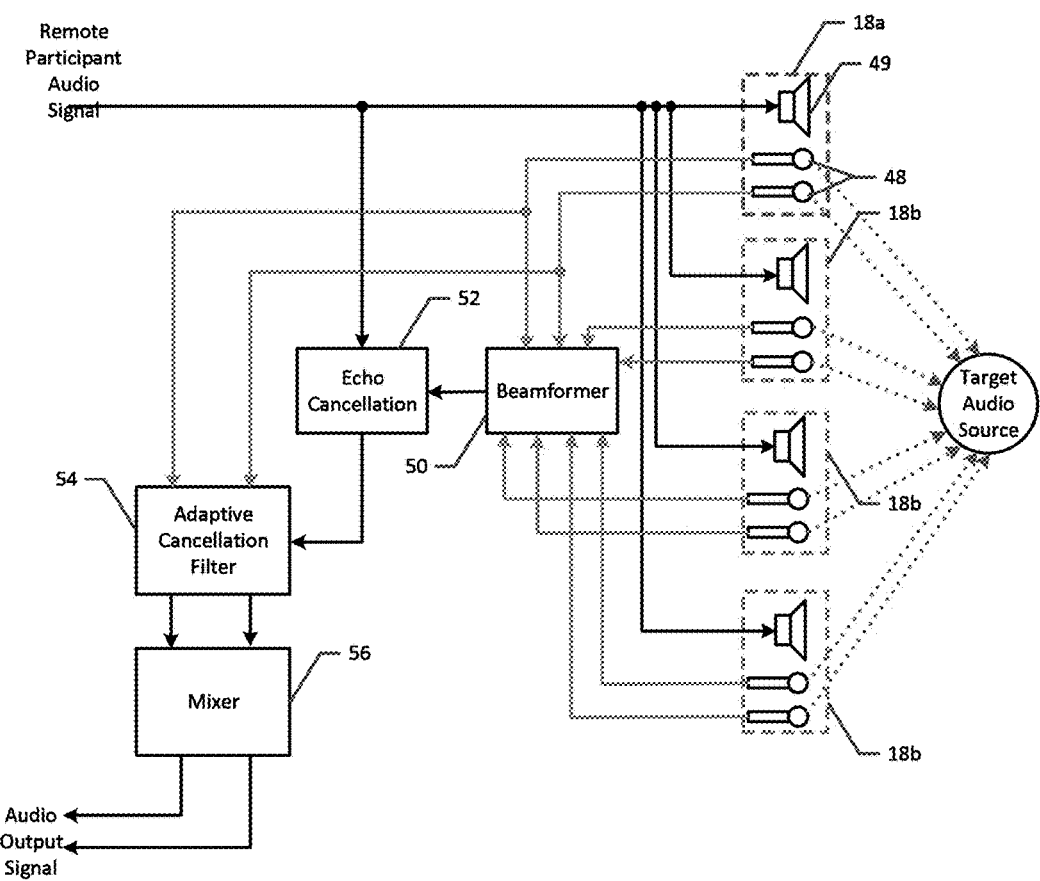
Figure 5:
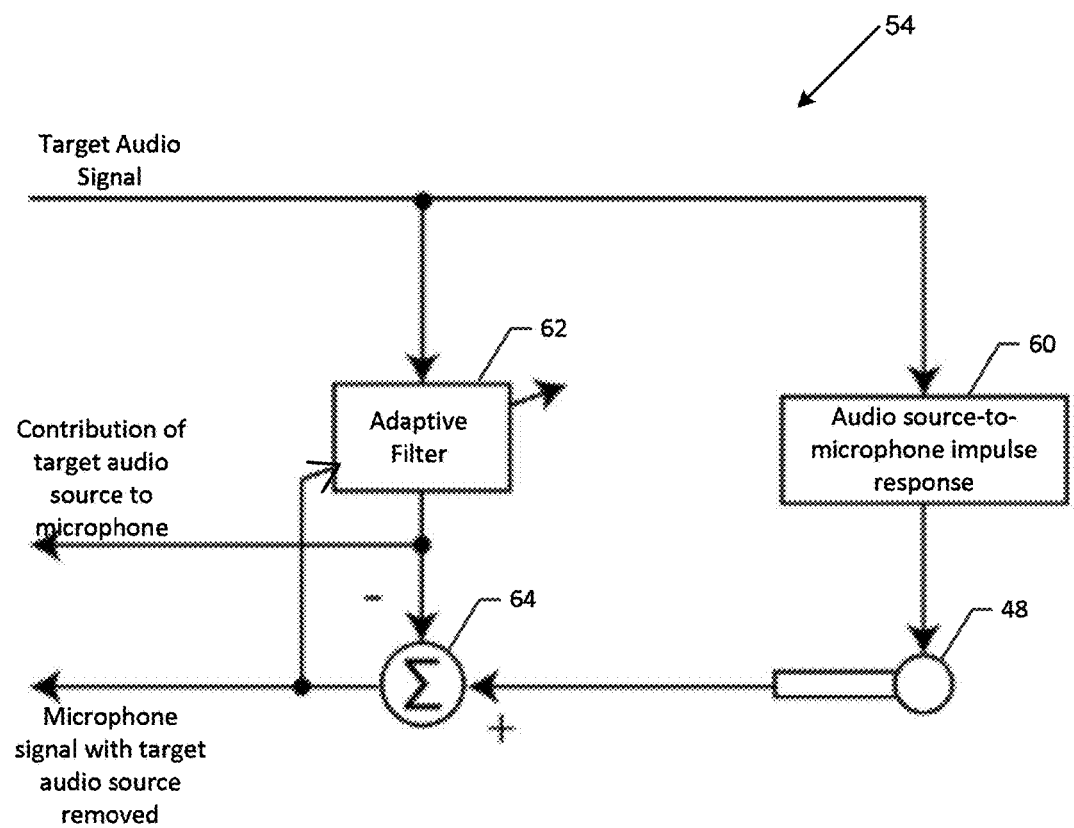
Figure 6:
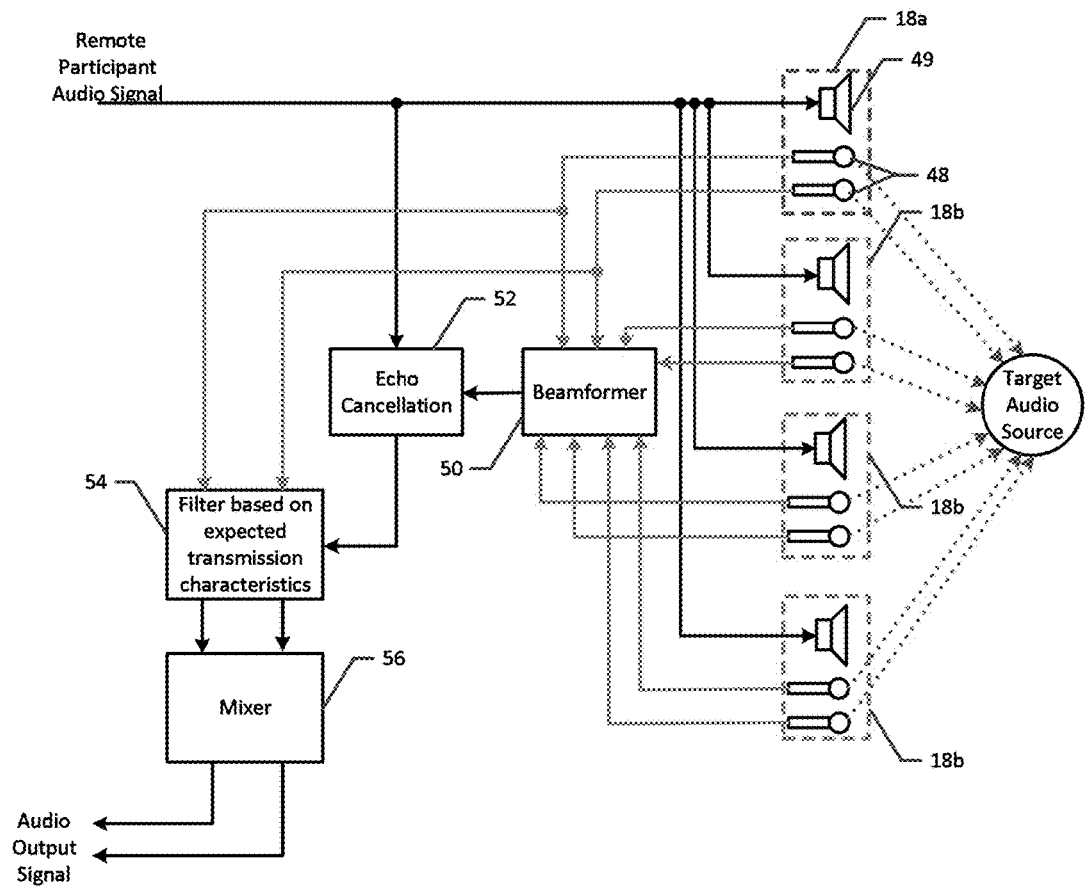
Figure 7:
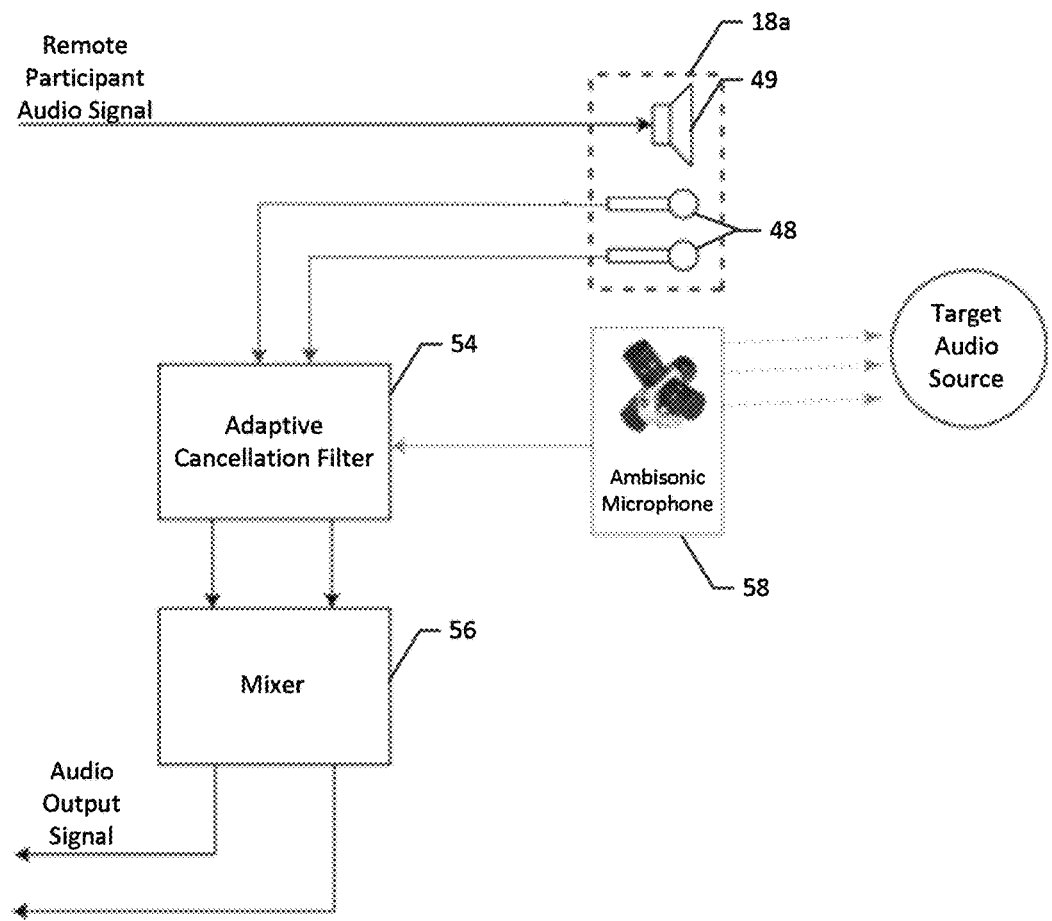
Figure 8:
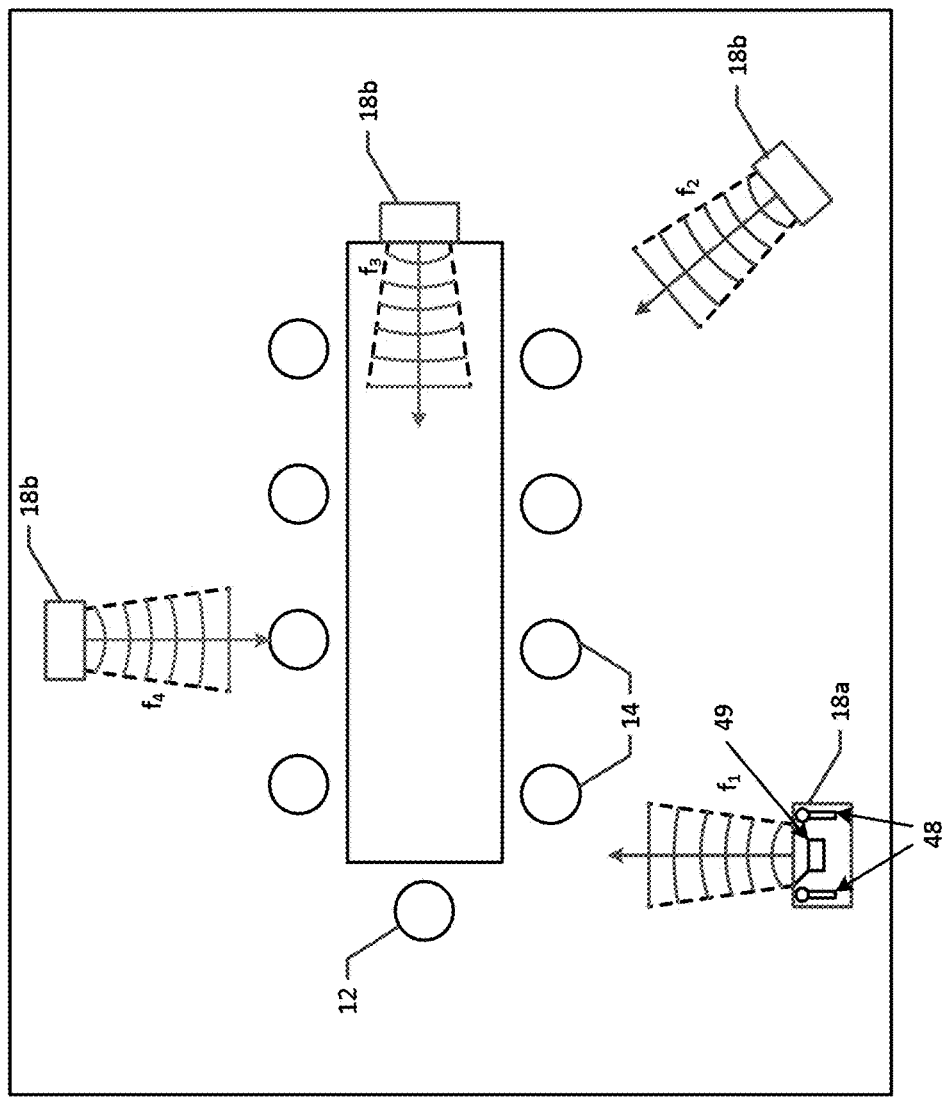
Figure 9:
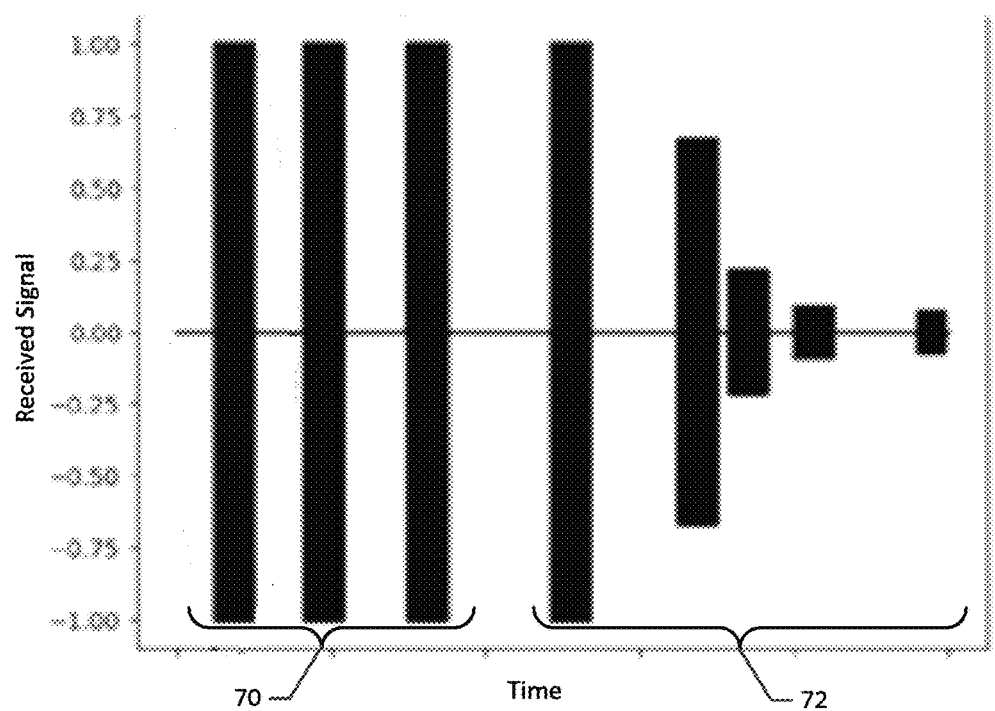

Having thus described certain example embodiments of the present disclosure in general terms, reference will hereinafter be made to the accompanying drawings, which are not necessarily drawn to scale, and wherein:

FIG. 1 is schematic representation of a system supporting voice communication in accordance with an example embodiment of the present disclosure;

FIG. 2 is a block diagram of an apparatus that is specifically configured in accordance with an example embodiment of the present disclosure;

FIG. 3 is a flowchart illustrating operations performed, such as by the apparatus of FIG. 2, in accordance with an example embodiment of the present disclosure;

FIG. 4 is a more detailed block diagram of an apparatus that is specifically configured in accordance with another example embodiment of the present disclosure;

FIG. 5 is a block diagram of an adaptive cancellation filter of FIG. 4 in accordance with an example embodiment of the present disclosure;

FIG. 6 is a more detailed block diagram of an apparatus that is specifically configured in accordance with a further example embodiment of the present disclosure;

FIG. 7 is a more detailed block diagram of an apparatus that is specifically configured in accordance with yet another example embodiment of the present disclosure;

FIG. 8 is a schematic representation of a system having multiple sources of mechanical pressure waves in order to permit the location of a plurality of microphones to be located in accordance with an example embodiment of the present disclosure; and FIG. 9 is a graphical representation of mechanical pressure waves received by a microphone over time which permit the location of a plurality of microphones to be located in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and a computer program product are provided for supporting point-to-point communication between audio sources at first and second in different locations. Different types of point-to-point communication may be supported including, for example, the voice communication required for remote participation in a meeting. In this regard, a meeting may be conducted in person at a first location with voice communication being provided to a second, remote location at which another participant is located and is included in the meeting, albeit remotely. In this regard, the remote participant may have a bi-directional audio connection with the first location at which the meeting is conducted and, in some embodiments, a bi-directional video connection with the first location. In order to facilitate the participation and inclusion by the remote participant in the meeting, the audio or the audio and visual experience for both the remote participant and the participants attending the meeting in person at the first location is preferably as immersive as possible, thereby permitting greater collaboration between the meeting participants, be it within the meeting room or remotely.

One example of point-to-point communication in the form of remote participation in a meeting is depicted in FIG. 1. As shown, a meeting is being conducted in a first location 10 with a number of participants sitting around a conference table. In this example, the participants include one participant 12, termed a target audio source, who is currently speaking and a number of participants 14 who are currently listening. In addition to the participants who attend the meeting in person, another participant is included in the meeting from a remote location. The remote participant may utilize a second device, which may be embodied by any of a variety of communication devices, in order to participate in a meeting. For example, the remote participant may utilize a second device in the form of a telephone, a speakerphone or the like in order to establish audio communication with the participants at the first location. Alternatively and as shown in FIG. 1, the participant may utilize a second device in the form of a computing device 16, such as a laptop computer, a personal computer, a computer workstation or the like, for supporting bi-directional audio communications with the participants within the meeting, such as via a Voice Over Internet Protocol (VOIP) connection, and, in some instances also supporting a video connection with the participants at the first location.

In the embodiment depicted in FIG. 1, a first device, such as one or more remote participant units 18, may be positioned at the first location, such as on or about the conference table, so as to be in the same environment as the target audio source. The first device, such as the remote participant units, includes one or more audio capture devices for capturing audio signals emanating from various audio sources, such as the participants, at the first location 10. For example, the audio capture devices may be one or more microphones as discussed hereinbelow by way of example, but not of limitation. The first device, such as the remote participant units, may also include one or more audio output devices for producing audio signals at the first location based upon audio input provided by the remote participant. By way of example, but not of limitation, the audio output devices may include one or more speakers. In instances in which not only an audio connection is established with the remote participant, but also a video connection is established with the remote participant, the remote participant unit may also include a display device for presenting an image of the remote participant that has been captured, for example, by an image capture device, such as a camera, at the second location. In some embodiments, the first device, such as a remote participant unit, may also include an image capture device, such as one or more cameras, for capturing an image of the first location and/or one or more participants at the first location and for providing the image to the remote participant, such as for display to the remote participant.

As shown in FIG. 1, the first device, such as a remote participant unit 18, may be integrated with the audio capture device(s) and the audio output device(s) and optionally the display device and an image capture device included within a single housing. Alternatively, the foregoing components of the first device, such as the remote participant unit, may be distributed about the first location 10, such as with the audio capture device(s) and the audio output device(s) placed upon the conference table and the display device and the image capture device mounted upon a wall. In terms of facilitating remote participation, however, the inclusion of a first device, such as a remote participant unit, in which each of the components is integrated into a common housing may serve to enhance the immersive effect.

In order to support point-to-point communication, e.g., voice communication, such as for a remote participant in a meeting, and to enhance the immersive effect enjoyed by the remote participant, an apparatus 20 is provided in accordance with an example embodiment. The apparatus may be disposed at the first location 10, the second location, such as the location of the remote participant, or another location in communication with both the first and second locations. In one embodiment, for example, the apparatus is also integrated within the first device, such as a remote participant unit 18, or is other located at the first location, such as at or proximate the location of the meeting. In another embodiment, the apparatus is integrated within a teleconferencing system in communication with the remote participant units. In yet another embodiment, the apparatus is integrated within the second device utilized, for example, by the remote participant. Regardless of the location of the apparatus, the apparatus may be embodied by any of a variety of computing devices, such as a server, a personal computer, an audio processor, an audio/video system or the like. Regardless of the manner in which the apparatus is embodied, the apparatus of an example embodiment includes, is associated with or otherwise is in communication with a processor 22, an associated memory 24 and a communication interface 26. In embodiments in which the apparatus is embodied by a computing device 16 associated with the remote participant or a remote participant unit, the apparatus may also optionally include a user interface 28.

The processor 22 (and/or co-processors or any other circuitry assisting or otherwise associated with the processor) may be in communication with the memory device 24 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an audio processing system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication interface 26 may be any means such as a device or circuitry embodied in either hardware or a combination of hardware and software that is configured to receive and/or transmit data from/to a network and/or otherwise communicate with a remote participant unit 18 at the first location 10. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as embodiments in which the apparatus 20 is embodied by a computing device 16 associated with the remote participant or a remote participant unit 18, the apparatus may also include a user interface 28 that may, in turn, be in communication with the processor 22 to receive audio and optionally video input and/or to cause presentation of audio and optionally video output. As such, the user interface may include, for example, an audio capture device, such as a microphone, and an audio output device, such as a speaker, and optionally a display device and an image capture device, such as a camera, or other input/output mechanisms. Alternatively or additionally, the processor 22 may comprise user interface circuitry configured to control at least some functions of one or more user interface elements such as, for example, an audio capture device, and audio output device and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

In some embodiments, the apparatus 20 may include or otherwise be in communication with a display device 16 that may, in turn, be in communication with the processor 22 to cause presentation of the video content of the scene. As such, the display device may include, for example, a display, a touch screen, or other visual output mechanism. For example, the display device may be a helmet mounted display, a flat panel display or the like. Alternatively or additionally, the processor may comprise user interface circuitry configured to control at least some functions of the display device such as, for example, a display, and/or the like. The processor and/or user interface circuitry comprising the processor may be configured to control one or more functions of the display device through computer program instructions (e.g., software and/or firmware) stored on a memory accessible to the processor (e.g., memory device 14, and/or the like).

Referring now to FIG. 3, the operations performed, such as by the apparatus 20 of FIG. 2, in accordance with an example embodiment are depicted. As noted above, the remote participant typically receives audio signals that have been captured by two or more microphones present at the first location 10, such as two or more microphones of the remote participant unit 18a associated with the remote participant. The remote participant unit 18a associated with the remote participant may be designated in various manners, such as based upon a selection by the remote participant or by one or more of the participants at the first location. Separately for each of the two or more microphones of at least the first device, such as remote participant unit 18a, that are configured to capture a target audio source associated with the first location, the apparatus of an example embodiment includes means, such as the processor 22 or the like, for generating a target audio signal at least from audio signals captured by the two or more microphones of at least the first device that have been steered in a direction of a target audio source, thereby providing audio spatialization, improving audio quality and improving speech intelligibility by reducing room reverberation. See block 30 of FIG. 3. Various target audio sources may produce the audio signals from which the target audio signal is generated. In the example of FIG. 1, the participant 12 at the first location is speaking and, as a result, serves the target audio source from which the target audio signal is generated. The target audio source at the first location may change over time as different participants speak.

The apparatus 20, such as the processor 22, may be configured to generate the target audio signal that is steered in the direction of the target audio source in various manners. By steering the target audio signal in the direction of the target audio source, the audio signals provided by the target audio source are emphasized, while deemphasizing the audio signals provided by one or more second audio sources, such as other participants in the meeting or remote participant devices 18 other than the one associated with the remote participant, at the first location. In one embodiment depicted in more detail in FIG. 4, the apparatus, such as the processor, includes means, such as a beamformer 50, configured to apply beamforming to the audio signals received by a plurality of microphones in the same environment as the target audio source including the two or more microphones 48 of the first device, such as the remote participant unit 18a, via which the remote participant receives the audio signals. By way of example but not of limitation, FIG. 4 depicts four remote participant units including a remote participant unit associated with the remote participant that is currently under discussion as well as three other remote participant units 18b that may be associated with other remote participants. However, any number of remote participant units may be included at the first location. Alternatively, the plurality of microphones that capture the audio signals at the first location may be provided independent of remote participant units with reference to remote participant units being made merely by way of example, but not of limitation. In the illustrated embodiment, however, each of the remote participant units includes at least two microphones that capture the audio signals at the first location.

The apparatus 20, such as the processor 22 and, more particularly, the beamformer 50 embodied by the processor of this example embodiment, receives the audio signals from the microphones 48 and processes the audio signals with a beamforming algorithm in order to steer the target audio signal generated by the beamformer in the direction of the target audio source, such as the participant 12 who is currently speaking or currently speaking the loudest at the first location. Thus, the beamformer functions to emphasize the target audio source, while deemphasizing one or more potentially interfering sources. In one example embodiment, the beamformer outputs a single channel of data. In this regard, the beamformer of one example embodiment is a multi-channel beamformer, but provides a monophonic output with the audio signals captured by each of a plurality of microphones being combined into a single channel.

In advance of steering the target audio signal in the direction of the target audio source, the location of the target audio source and the location of each of the plurality of microphones at the first location including the microphones 48 via which the remote participant receives audio signals may be established. The location of the target audio source may be established in various manners. For example, the location of the target audio source may be predefined. Alternatively, the beamformer 50 may steer or scan the audio signals received from the plurality of microphones across or throughout the first location and may be configured to analyze the audio signals that are received in order to identify the direction in which the microphones were steered for which the audio signals having the greatest strength were captured and may thereafter utilize the direction in which the strongest audio signals were received as being indicative of the location of the target audio source. As noted above, the location of each of the plurality of microphones may also be established. In this regard, the location of the plurality of microphones may be established in various manners. For example, the location of the microphones may be predefined. Alternatively and as described hereinafter, the location of the microphones at the first location may also be established in other manners that are not dependent upon the placement of the microphones in predefined locations.

In the embodiment depicted in block 34 of FIG. 3 and block 52 of FIG. 4, the apparatus 20 also includes means, such as the processor 22 or the like, for applying echo cancellation to the target audio signal to reduce, such as by eliminating, the contribution to the target audio signal from the audio signals provided by the remote participant and output, such as via speaker 49 of the remote participant unit 18a, in the same environment as the target audio source. In this regard, the target audio signal, such as generated by the beamformer 50 of the embodiment of FIG. 4, may be processed based upon a sample of the audio signals provided by the remote participant and output by the speaker at the first location in order to reduce, such as by removing, the audio signals provided by the remote participant from the target audio signal captured by the microphones 48 and generated by the beamformer. By applying echo cancellation, the quality of the resulting audio signals that are subsequently provided to the remote participant are of higher quality by including less, if any, feedback. Although echo cancellation is described herein as being applied to the audio signals output by speaker 49, the echo cancellation may be applied to the same audio signals provided by the remote participant that are output by multiple speakers or to different audio signals provided by the remote participant that are output by multiple speakers.

The apparatus 20 of an example embodiment also includes means, such as the processor 22 or the like, for producing a filtered audio signal based on the target audio source at least from the audio signals captured by a respective one of the two or more microphones of the first device. See block 36 of FIG. 3. The filtered audio signal is produced so as to be based upon the target audio signal that has been steered in the direction of the target audio source, thereby emphasizing the audio signals provided by the target audio source and deemphasizing the audio signals provided by other audio sources in the same environment as the target audio source. By being based upon the target audio signal that may have been subjected to echo cancellation, the filtered audio signal that is produced also reduces the contribution from audio signals output by the speaker 49 located in the same environment as the target audio source. The filtered audio signal may be produced in various manners. In this regard, the apparatus of an example embodiment includes means, such as the processor or the like, for filtering an audio signal received from the respective microphone based upon the target audio signal. As shown in the embodiment of FIG. 4, for example, the processor of an example embodiment may include an adaptive cancellation filter 54 configured to filter the audio signal by utilizing an adaptive cancellation algorithm in order to separate the contribution of the target audio source, such as the person 12 who is currently speaking at the first location 10, from other second audio sources, such as noise sources at the first location. Although adaptive cancellation filters may be embodied in a variety of different manners, the adaptive cancellation of a filter of one example embodiment depicted in FIG. 5.

As shown in FIG. 5, the physics of sound propagation from the target audio source to a receiver, such as microphone 48, as illustrated by the audio source-to-microphone impulse response 60 may be represented by a filter, such as a finite impulse response (FIR) filter. In this example embodiment, an adaptive filter 62 is configured to estimate the FIR filter. If properly configured, the convolution of the estimated filter and reference audio signal generated by the beamformer 50 serves to isolate the contribution of the target audio source to the audio signal captured by the microphone. By subtracting the contribution of the target audio source to the audio signal captured by the microphone from the audio signal captured by the microphone as shown at block 64, a signal containing the remainder of the audio signal captured by the microphone is also generated which, in turn, is fed back to the adaptive filter. As shown in FIG. 5, both the contribution of the target audio source to the audio signals captured by the microphone and the audio signals captured by the microphone from which the audio signals that originate with the target audio source have been removed are separately generated. The contribution of the target audio source to the audio signals captured by the microphone that is generated by the adaptive filter serves as the filtered audio signal of the target audio source.

The filtered audio signal may be produced in other manners. As shown, for example, in FIG. 6, which is similar to FIG. 4 in many respects, the apparatus 20 of another example embodiment may include means, such as the processor 22 or the like, for producing the filtered audio signal by filtering the target audio signal based upon expected transmission characteristics of audio signals during propagation at the first location 10 from the target audio source to the respective microphone 48. See block 54 of FIG. 6. In this regard, the expected transmission characteristics are based upon the distance and angle of the target audio source from the respective microphone as well as information regarding the propagation of sound through air, head-related transfer functions (HRTFs) and the interaural level and phase differences of human ears. Based upon these parameters, the expected transmission characteristics of audio signals are predicted mathematically with the resulting mathematical model then utilized in order to filter the target audio signal in accordance with the expected transmission characteristics. In comparison to the embodiment of FIG. 4 in which the adaptive cancellation filter 54 receives both the target audio signal as well as the audio signals captured by the microphones 48 via which the remote participant listens to the meeting, the filter of the embodiment of FIG. 6 receives and processes the target audio signal, but not the audio signals captured by the microphones via which the remote participant listens to the meeting. Thus, the target audio signal may be processed by the filter of FIG. 6 such that the resulting filtered audio signals represent the audio signals that would be heard by a virtual microphone at any position at the first location, such as in an instance in which the remote participant unit 18a did not include microphones.

As noted above and as indicated in conjunction with blocks 32, 34 and 36 of FIG. 3, the generation of the target audio signal, the optional echo cancellation and the production of a filtered audio signal are separately performed for the audio signals received by each of the two or more microphones 48 of at least the first device present at the first location 10 via which the remote participant receives audio signals. Thus, in the example embodiments depicted in FIGS. 4 and 6 in which a remote participant unit 18a associated with the remote participant includes a pair of microphones, such as a pair of microphones separated by a spacing that approximates the distance between two human ears, the generation of the target audio signal, the optional echo cancellation, the production of the filtered audio signal are performed separately for the audio signals captured by each of two microphones.

The apparatus 20 of this example embodiment also includes means, such as the processor 22 or the like and, in the embodiments of FIGS. 4 and 6, a mixer 56 embodied by the processor, for mixing the filtered audio signal from at least the first device, such as from each of the microphones 48 of the first device, via which the remote participant receives audio signals, such as each of the microphones of the remote participant unit 18a associated with the remote participant, to create an audio output signal associated with an audio playback format, such as binaural, stereo, etc. See block 38 of FIG. 3. By mixing the filtered audio signals from each of the two or more microphones, the multi channel audio output signal more accurately represents the audio signals that would have been heard by the remote participant had the remote participant been physically located at the first location 10 in the same position as the microphones. In this regard, the two or more microphones emulate the capture of audio signals by the ears of a remote participant which are separated apart from one another and which therefore received the audio signals from the same target audio source at slightly different times. Consequently, the resulting audio output signal more realistically reflects the experience the remote participant would have had if the remote participant were at the first location, thereby improving the user experience of the remote participant and increasing the immersive nature of the point-to-point communication, e.g., voice communication, for the remote participant.

The apparatus 20 also includes means, such as the processor 22, the communication interface 26 or the like, for causing the audio output signal to be provided to the participant at the second location. Thus, the audio output signal may be output to the remote participant at the second location, such as via an audio output device, e.g., a speaker of the computing device 16, or the like. By having steered the target audio signal in the direction of the target audio source and then producing a filtered audio signal of the target audio source from the perspective of a respective microphone 48 at the first location 10 via which the remote participant receives audio signals, the resulting audio output signal that is provided to the remote participant is spatially localized. In this regard, the spatial localization makes the resulting audio output signal appear to originate from the location at which the target audio source is located, such as participant 12 at the head of the conference table, relative to the microphones that captured the audio signals, such as the microphones of a remote participant unit 18a associated with the remote participant. The spatial localization and the echo cancellation also avoids or reduces issues associated with deleterious feedback. Additionally, further echo cancellation can be applied in some embodiments in order to reduce, such as to eliminate, audio signals that originate with other second audio sources, such as noise sources, in the same environment as the target audio source. In this example embodiment, the apparatus, such as the processor or the like, is configured to perform echo cancellation so as to reduce, such as to remove, audio signals that originate from audio sources at locations other than the location of the target audio source who is currently speaking during the meeting. Thus, the resulting quality of the audio output signals provided to the remote participant is enhanced. Further enhancements are provided by the audio output signals received by two or more microphones of at least the first device that emulates the manner in which a person hears audio signals with their ears. Consequently, the user experience enjoyed by the remote participant is enhanced by increasing the immersive nature of the point-to-point communication, e.g., voice communication, between the remote participant and the first location.

Although the generation of the target audio signal has been described above in conjunction with the beamforming of the audio signals, the target audio signal may be generated in other manners. For example, instead of or in addition to the beamforming of the audio signals, the apparatus 20, such as the processor 22, may be configured to emphasize the audio signals from one audio source, such as the target audio source, while deemphasizing the audio signals from one or more other potentially interfering sources in other manners. In this regard, the apparatus, such as the processor, may be configured to differently weight the audio signals from the different audio sources, such as by more greatly weighing the audio signals from one audio source, such as the target audio source, in order to emphasize those audio signals, while applying a lesser weight to the audio signals from one or more other potentially interfering sources in order to deemphasize the potentially interfering audio signals.

In the embodiment depicted in FIG. 7, for example, the audio signals may be captured not only by the two or more microphones 48 that capture the audio signals eventually provided to the remote participant, but also by an ambisonic microphone 58. An ambisonic microphone employs multi-channel audio acquisition with mathematical mixing of the multi-channel output to provide for three dimensional spatial audio rendering. Thus, an ambisonic microphone generates the target audio signal that has been steered in the direction of the target audio source at the first location 10, thereby at least partially isolating the audio source. As shown in the example embodiment of FIG. 7, the audio signals captured by a microphone of the remote participant unit 18a and the target audio signal generated by the ambisonic microphone are processed, such as by the processor 22 embodying an adaptive cancellation filter 54, in order to produce the filtered audio signal. By repeating this process for the audio signals captured by each of the microphones of the remote participant unit and then mixing the filtered audio signals, an audio output signal may be created that may then be provided to the remote participant as described above.

As also noted above, the location of each of a plurality of microphones 48 at the first location 10, including the two or more microphones from which the remote participant receives audio signals, may be established prior to generating the reference audio signal. The location of each of the plurality of microphones may be established in various manners. For example, the location of each of the microphones may be predefined. Alternatively, the locations of the plurality of microphones may be established by interrogating the first location and identifying the locations of the microphones. For example, mechanical pressure waves, such as ultrasonic (or higher frequency) signals, sound waves or the like, of a predefined frequency may be generated by each of a plurality of speakers 49 at the first location. The speakers may be positioned at predefined locations at the first location. In the embodiment that includes a plurality of remote participant units as shown in FIG. 1 and described above, the speakers may be collocated with one or more microphones 48 such that the location of the speakers need not be predefined other than by the collocated nature of the speaker and one or more microphones.

In one embodiment, each speaker 49 is separately caused to emit mechanical pressure waves with the other speakers providing no output until the measurements associated with the mechanical pressure waves output by one speaker have concluded. This process may then be repeated separately for each of the speakers. Alternatively, the mechanical pressure waves emitted by each of the speakers may have a different frequency. In this example embodiment, each of the speakers may be caused, such as by the apparatus 20 and, more particularly, by the processor 22, to output mechanical pressure waves at a respective frequency at the same time with the resulting measurements being able to discriminate with respect to the origin of the mechanical pressure waves by the frequency thereof. As shown in FIG. 8, each of four remote participant units includes a speaker that is caused to create a mechanical pressure wave at a respective frequency designated $f_1$, $f_2$, $f_3$ and $f_4$.

Following the generation of the mechanical pressure waves, each of the plurality of microphones 48 captures the mechanical pressure waves incident thereupon. The apparatus 20, such as the processor 22 or the like, identifies the time at which the mechanical pressure waves were received by a respective microphone as well as the frequency of the mechanical pressure waves. In this regard, the time between the generation of the mechanical pressure waves and the reception of the mechanical pressure waves by a respective microphone is based upon the distance traveled by the mechanical pressure waves from the speaker 49 to the respective microphone. The sampling rate will dictate the maximum achievable spatial accuracy. For example, a sampling rate of 44.1 kHZ will provide for a maximum achievable spatial accuracy of about 8 mm. In one embodiment, the frequency of the mechanical pressure waves may be determined in the Fourier domain following an analog-to-digital conversion or in the time domain following filtering, e.g., notch filtering.

By way of example, FIG. 9 graphically depicts the amplitude of the mechanical pressure waves received by a microphone 48 of remote participant unit 18a over the course of time. Initially, the mechanical pressure waves generated by the speakers 49 associated with the other three remote participant units 18b are received at slightly different times due to the different distances between the other remote participant units and the remote participant unit that includes the microphone capturing the signals depicted graphically in FIG. 9. The magnitude of the mechanical pressure waves received by the microphone during this initial period 70 are generally the same or nearly the same as the mechanical pressure waves that have traveled directly from the speaker of another remote participant unit 18b to the microphone of remote participant unit 18a without interaction with other surfaces.

Following the initial period 70 in which the mechanical pressure waves are received directly from speakers 49 of the other remote participant units 18b, mechanical pressure waves are received at a later point in time during a second period 72 in which the mechanical pressure waves have reflected from a surface, such as the wall of the conference room at the first location 10, and then been redirected to the microphone 48. In the second period, the initial relatively large mechanical pressure wave that is received may be the reflection of the mechanical pressure wave created by the speaker associated, e.g., co-located, with the microphone of remote participant unit 18a following reflection of the mechanical pressure wave, such as from a wall in the conference room. The other mechanical pressure waves that are received during the second period have smaller amplitudes and may be reflected representations of the mechanical pressure waves generated by the speakers of the other remote participant units following reflection from one or more surfaces throughout the room.

Based upon the timing of the receipt of the mechanical pressure waves and the relative amplitude of the mechanical pressure waves by each of the plurality of microphones 49, the apparatus 20, such as the processor 22, is configured to estimate the location of each of the plurality of microphones at the first location. In some embodiments, the size and shape of other features or other acoustical properties of the room that serves as the first location may also be determined based upon the mechanical pressure waves that are captured during the second period 72, thereby facilitating echo cancellation. By estimating the location of each of the microphones, the audio signals captured by the microphones from the target audio source may then be processed as described above in a more accurate manner including the steering of the target audio signal in the direction of the target audio source relative to the estimated location of a microphone.

In an instance in which the mechanical pressure waves are ultrasonic signals, the high frequencies may fall outside of the linear frequency range of a standard microphone. However, since only time-of-arrival accuracy is required, the location of the microphones may still be determined. However, if the mechanical pressure waves fall within the linear frequency range of the microphones 48, the expected attenuation of signals of each frequency in air may be predicted based upon propagation distance, such as in accordance with Stokes' Law of Attenuation. This prediction may be compared with the observed levels of attenuation to further enhance the accuracy and robust nature of the estimated locations of the microphones.

In instances in which the mechanical pressure waves are at frequencies outside of the audible frequency range, the mechanical pressure waves may be superimposed upon the audio signals which communicate speech between the remote participant and other participants at the first location 10. Further, in an instance in which the location of a microphone may change, the location of the microphones may be estimated repeatedly, such as continuously or at specific time intervals.

The location of each of the plurality of microphones 48 may be estimated in other manners. For example, one or more images of the first location 10 may be captured, such as by the image capture device of the remote participant units 18. The images may include images of the plurality of microphones or remote participant units that include the microphones. In this example embodiment, the apparatus 20, such as the processor 22, or an image processor, either embodied by or separate from the apparatus, may analyze the images, including the various edges of the objects within the images and the angles of those edges, such as by employing an edge detection algorithm, e.g., Canny's method, Hough transforms, feature matching or other computer vision techniques, in order to estimate the location, e.g., distance to and angle of orientation, of each of the plurality of microphones at the first location including the two or more microphones from which the remote participant receives the audio signals. In some embodiments, multiple techniques for estimating the locations of the microphones may be combined to increase the redundancy and robustness of the location determinations, such as may be desired in an instance in which the audio or video transmission path is blocked, e.g., by furniture or a person moving throughout the room.

As described above, FIG. 3 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed lines in FIGS. 2 and 3. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method for providing voice communication between at least a first device at a first location and at least a second device at a second location, wherein at least the second device is remote from the first location, and wherein the method comprises:

for each of two or more microphones of at least the first device configured to capture audio output by a target audio source associated with the first location, wherein the first device is one of a plurality of devices that are located in a same environment as the target audio source:

generating a target audio signal at least from audio signals captured by the two or more microphones that have been steered in a direction of the target audio source in order to provide at least partial isolation from a second audio source in the same environment as the target audio source; and producing a filtered audio signal based on the target audio source at least from a respective one of the two or more microphones, wherein the filtered audio signal is produced so as to be based on the target audio signal that is steered in the direction of the target audio source, to deemphasize the second audio source and to reduce a contribution from audio signals output by a speaker located in the same environment as the target audio source;

mixing the filtered audio signal from at least the first device to create an audio output signal associated with an audio playback format; and causing the audio output signal to be output by the second device in accordance with the audio playback format.

2. A method according to claim 1 wherein producing the filtered audio signal comprises filtering an audio signal received from the respective one of the two or more microphones based upon the target audio signal.

3. A method according to claim 2 wherein filtering the audio signal comprises filtering the audio signal utilizing an adaptive cancellation algorithm in order to separate a contribution of the target audio source from the second audio source.

4. A method according to claim 1 wherein producing the filtered audio signal comprises filtering the target audio signal based upon expected transmission characteristics of audio signals from the target audio source to the respective one of the two or more microphones.

5. A method according to claim 1 wherein generating the target audio signal comprises applying beamforming to audio signals received by a plurality of microphones in the same environment as the target audio source including the two or more microphones of the first device in order to steer the target audio signal in the direction of the target audio source.

6. A method according to claim 1 wherein generating the target audio signal comprises receiving the target audio signal from an ambisonic microphone in the same environment as the target audio source that has been steered in the direction of the target audio source.

7. A method according to claim 1 wherein audio signals are capable of being outputted from the speaker located in the same environment as the target audio source, and wherein the method further comprises applying echo cancellation to the target audio signal prior to producing the filtered audio signal in order to reduce the contribution from the audio signals output by the speaker to the filtered audio signal.

8. A method according to claim 1 further comprising estimating a location of each of a plurality of microphones located in the same environment as the target audio source including the two or more microphones of the first device by analyzing a time-of-arrival of a mechanical pressure wave captured by each of the plurality of microphones in response to a mechanical pressure wave output by a source.

9. A method according to claim 1 further comprising estimating a location of each of a plurality of microphones located in the same environment as the target audio source including the two or more microphones of the first device by analyzing an image of the plurality of microphones.

10. An apparatus for providing voice communication between at least a first device at a first location and at least a second device at a second location, wherein at least the second device is remote from the first location, and wherein the apparatus comprises at least one processor and at least one memory including computer program code, the at least one memory and the computer program code configured to, with the processor, cause the apparatus to at least:

for each of two or more microphones of at least the first device configured to capture audio output by a target audio source associated with the first location, wherein the first device is one of a plurality of devices that are located in a same environment as the target audio source:

generate a target audio signal at least from audio signals captured by the two or more microphones that have been steered in a direction of the target audio source in order to provide at least partial isolation from a second audio source in the same environment as the target audio source; and produce a filtered audio signal based on the target audio source at least from a respective one of the two or more microphones, wherein the filtered audio signal is produced so as to be based on the target audio signal that is steered in the direction of the target audio source, to deemphasize the second audio source and to reduce a contribution from audio signals output by a speaker located in the same environment as the target audio source;

mix the filtered audio signal from at least the first device to create an audio output signal associated with an audio playback format; and cause the audio output signal to be output by the second device in accordance with the audio playback format.

11. An apparatus according to claim 10 wherein the at least one memory and the computer program code are configured to, with the processor, cause the apparatus to produce the filtered audio signal by filtering an audio signal received from the respective one of the two or more microphones based upon the target audio signal.

12. An apparatus according to claim 11 wherein the at least one memory and the computer program code are configured to, with the processor, cause the apparatus to filter the audio signal by filtering the audio signal utilizing an adaptive cancellation algorithm in order to separate a contribution of the target audio source from the second audio source.

13. An apparatus according to claim 10 wherein the at least one memory and the computer program code are configured to, with the processor, cause the apparatus to produce the filtered audio signal by filtering the target audio signal based upon expected transmission characteristics of audio signals from the target audio source to the respective one of the two or more microphones.

14. An apparatus according to claim 10 wherein the at least one memory and the computer program code are configured to, with the processor, cause the apparatus to generate the reference audio signal by applying beamforming to audio signals received by a plurality of microphones in the same environment as the target audio source including the two or more microphones of the first device in order to steer the target audio signal in the direction of the target audio source.

15. An apparatus according to claim 10 wherein the at least one memory and the computer program code are configured to, with the processor, cause the apparatus to generate the target audio signal by receiving the target audio signal from an ambisonic microphone in the same environment as the target audio source that has been steered in the direction of the target audio source.

16. An apparatus according to claim 10 wherein audio signals are capable of being outputted from the speaker located in the same environment as the target audio source, and wherein the at least one memory and the computer program code are further configured to, with the processor, cause the apparatus to apply echo cancellation to the target audio signal prior to producing the filtered audio signal in order to reduce the contribution from the audio signals output by the speaker to the filtered audio signal.

17. A computer program product for providing voice communication between at least a first device at a first location and at least a second device at a second location, wherein at least the second device is remote from the first location, and wherein the computer program product comprises at least one non-transitory computer-readable storage medium having computer-readable program code portions stored therein, the computer-readable program code portions configured, upon execution, to:

for each of two or more microphones of at least the first device configured to capture audio output by a target audio source associated with the first location, wherein the first device is one of a plurality of devices that are located in a same environment as the target audio source:

generate a target audio signal at least from audio signals captured by the two or more microphones that have been steered in a direction of the target audio source in order to provide at least partial isolation from a second audio source in the same environment as the target audio source; and produce a filtered audio signal based on the target audio source at least from a respective one of the two or more microphones, wherein the filtered audio signal is produced so as to be based on the target audio signal that is steered in the direction of the target audio source, to deemphasize the second audio source and to reduce a contribution from audio signals output by a speaker located in the same environment as the target audio source;

mix the filtered audio signal from at least the first device to create an audio output signal associated with an audio playback format; and cause the audio output signal to be output by the second device in accordance with the audio playback format.

18. A computer program product according to claim 17 wherein the program code portions configured to produce the filtered audio signal comprise program code portions configured to filter an audio signal received from the respective one of the two or more microphones based upon the reference audio signal by utilizing an adaptive cancellation algorithm in order to separate a contribution of the target audio source from the second audio source.

19. A computer program product according to claim 17 wherein the program code portions configured to produce the filtered audio signal comprise program code portions configured to filter the target audio signal based upon expected transmission characteristics of audio signals from the target audio source to the respective one of the two or more microphones.

20. A computer program product according to claim 17 wherein the program code portions configured to generate the target audio signal comprise program code portions configured to apply beamforming to audio signals received by a plurality of microphones in the same environment as the target audio source including the two or more microphones of the first device in order to steer the target audio signal in the direction of the target audio source.

* * * * *